United States Patent
Yu et al.

(10) Patent No.: US 6,985,919 B2
(45) Date of Patent: Jan. 10, 2006

(54) TIME-RECURSIVE LATTICE STRUCTURE FOR IFFT IN DMT APPLICATION

(75) Inventors: Chi-Li Yu, Taipei (TW); An-Yeu Wu, Taipei (TW)

(73) Assignee: Industrial Technology Reseach Institute, Hsinchu Hsien (TW)

( * ) Notice: Subject to any disclaimer, the term of this patent is extended or adjusted under 35 U.S.C. 154(b) by 651 days.

(21) Appl. No.: 10/135,677

(22) Filed: Apr. 30, 2002

(65) Prior Publication Data

US 2003/0204544 A1    Oct. 30, 2003

(51) Int. Cl.
G06F 17/14        (2006.01)
(52) U.S. Cl. .................................... 708/404
(58) Field of Classification Search ......... 708/402–405
See application file for complete search history.

(56) References Cited

U.S. PATENT DOCUMENTS 5,633,817 A * 5/1997 Verhenne et al. ........... 708/404

6,157,938 A    12/2000 Wu et al.
2003/0212722 A1 * 11/2003 Jain et al. .................... 708/404
2004/0162866 A1 *  8/2004 Malvar ........................ 708/404

OTHER PUBLICATIONS

"An Improved Time-Recursive Lattice Structure for Low-Latency IFFT Architecture in DMT Transmitter" by Chi-Li Yu, Dept. of Electrical Engineering, National Central University, Taiwan and An-Yeu Wu, Dept. of Electrical Engineering, National Taiwan University, Taiwan, pp. IV-250-253.

* cited by examiner

Primary Examiner—Tan V. Mai
(74) Attorney, Agent, or Firm—Thomas, Kayden, Horstemeyer & Risley (57) ABSTRACT

The present invention may significantly reduce the number of iteration of the time recursive IFFT structure. First, the real and imaginary part of the input signal are modified based on the symmetric and anti-symmetric. Then, they are mixed together by an adder and fed into the lattice module. Next, an IFFT is performed on the modified input data sequence to generate a transformed sequence. Through the symmetric and anti-symmetric properties, the redundant terms may be eliminated.

18 Claims, 10 Drawing Sheets

TIME-RECURSIVE LATTICE STRUCTURE FOR IFFT IN DMT APPLICATION

FIELD OF THE INVENTION

The present invention relates to the Discrete Multitone (DMT) technology and, more particularly, to the Inverse Fast Fourier Transform (IFFT), the modulation kernel. By exploiting the symmetric/anti-symmetric properties of the input sequences, we add a new pre-processing scheme to further reduce the computational and the hardware complexity of the IFFT.

BACKGROUND OF THE INVENTION

Orthogonal transforms and transformation properties are extraordinarily useful in solving new technological problems. Such transforms permit analysis of most signals given some knowledge of its constituent parts. The Fourier transformation in particular has become a powerful tool in increasingly diverse fields including linear systems, communications systems, image processing applications, etc.

The discrete Fourier transformation (DFT) is the counterpart of the Fourier transformation in the discrete time domain. In general, the DFT may be defined as follows:

$$X(k) = \sum_{n=0}^{N-1} x(n) W_N^{kn}, \quad k = 0, 1, \ldots, N-1 \tag{1}$$

and the inverse DFT (IDFT) is expressed as:

$$x(n) = \frac{1}{N} \sum_{k=0}^{N-1} X(k) W_N^{-kn} \quad n = 0, 1, \ldots, N-1 \tag{2}$$

where $W_n = e^{-j2\pi/N}$ (3)

In equations (1) and (2), N is the amount of the sample, x(n) is the sample value in the time domain, and X(k) is the sample value in the frequency domain.

Direct calculation of the DFT and the IDFT is complex. It requires $N^2$ multiplications and $N(N-1)$ additions. Such computational may reduce signal processing speed, increased power consumption, and higher expense. One important tool in modern digital signal processing applications that helps to reduce that overhead is the Fast Fourier Transformation (FFT). By introducing the concept of divide-and-conquer, both the numbers of multiplication and addition are reduced to $N\log_2 N$ In Discrete Multitone (DMT)-based ADSL system, a 512-point IFFT/FFT module is required to perform the modulation/demodulation kernel. At the transmitter side of the DMT system, to ensure the IFFT generates only real-valued outputs, the inputs of the IFFT have the constraint $$X(k)=X^*(2N-k) \text{ for } k=0, 1, \ldots, N-1 \tag{4}$$

where N=256 and $$X(k)=X_r(k)+j \cdot X_i(k) \tag{5}$$

are encoded complex symbols with X(0)=X(N)=0. Here, $X_r(k)$ and $X_i(k)$ indicate the real part and imaginary part of X(k) respectively. As defined $$x(n) = \frac{1}{2N} \sum_{k=0}^{2N-1} X(k) W_{2N}^{-kn} \quad \text{for } n = 0, 1, \ldots, N-1 \tag{6}$$

in equation (2), the IDFT of a 2N samples sequence is where, in accordance with the equation (3)

$$W_{2N}^{-nk} \equiv e^{j2\pi nk/2N} = \cos\frac{2\pi nk}{2N} + j\sin\frac{2\pi nk}{2N} \tag{7}$$

In accordance with U.S. Pat. No. 6,157,938, the equation (6) is decomposed by the first half and the second half by decomposing the index k, and using the facts that X(0)=X(N)=0. Therefore, the equation (6) becomes $$x(n) = \frac{1}{2N}\left[\sum_{k=0}^{N-1} X(k) W_{2N}^{-kn} + \sum_{k=N}^{2N-1} X(k) W_{2N}^{-nk}\right] \tag{8}$$

Next, by applying the constraint of equation (4) and substituting equations (5) and (7) into (8), we can simplify equation (9) as follows:

$$x(n) = \frac{1}{2N} \cdot 2 \left[\sum_{k=0}^{N-1} X_r(k) \cos\frac{2\pi nk}{2N} - \sum_{k=0}^{N-1} X_i(k) \sin\frac{2\pi nk}{2N}\right] \tag{9}$$

$$= \frac{1}{N}[MDCT_r(n) - MDST_i(n)]$$

for $n = 0, 1, \ldots, 2N-1$

Where, $$MDCT_r(n) = \sum_{k=0}^{N-1} X_r(k) \cos\frac{2\pi nk}{2N} \tag{10}$$

$$MDST_i(n) = \sum_{k=0}^{N-1} X_i(k) \sin\frac{2\pi nk}{2N}$$

The equation (9) Fourier Transformation calculation includes two parts, the first term is Modified Discrete Cosine Transformation (MDCT) and the second term is Modified Discrete Sine Transformation (MDST). We use subscripts r and i to indicate that the operations are performed on the real and imaginary parts of input symbol X(k), respectively. Note that the $MDCT_r(n)$ and $MDST_i(n)$ involve only real-valued operators. Furthermore, from equation (10) it can be shown that $$MDCT_r(n) = MDCT_r(2N-n) \tag{11}$$

$$MDST_i(n) = -MDST_i(2N-n) \quad \text{for } n = 0, 1, \ldots, 2N-1$$

Consequently, calculation of equation (9) can be focused on the calculations of $MDCT_r(n)$ function and $MDST_i(n)$ function for n=0, 1, ..., N−1. Then the calculations of the $MDCT_r(n)$ function and the $MDST_i(n)$ function for n=N+1, ..., 2N−1 are expanded based upon equation (11). In this manner, this simple relationship can save an additional 50% hardware/software complexity.

Figure 1:
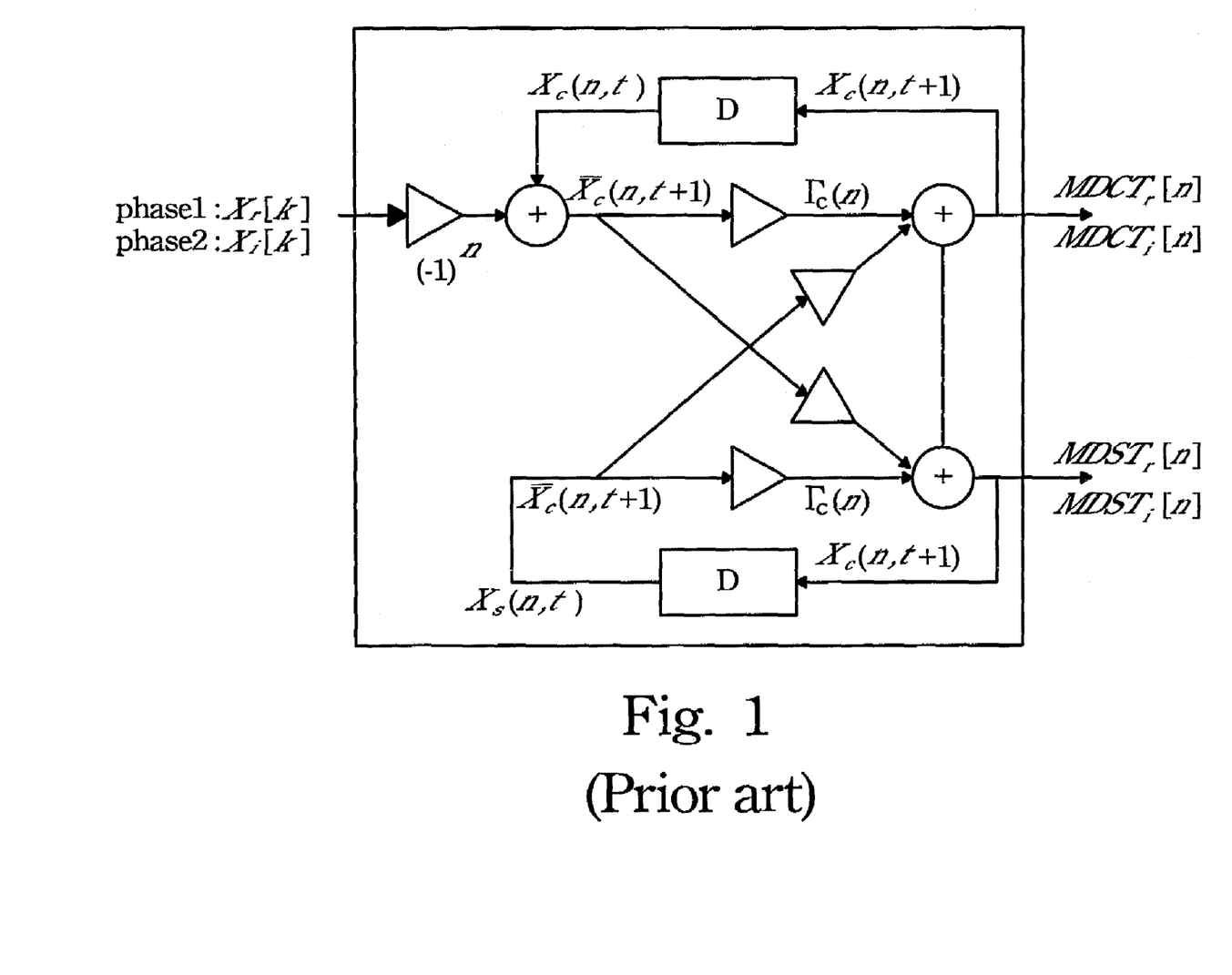
FIG. 1 is a detailed circuit diagram showing a detailed circuit diagram of the lattice modules for generation of the $MDCT_r(n)$ and the $MDST_i(n)$ of the prior art.

In U.S. Pat. No. 6,157,938, a time-recursive FFT architecture is provided. The modulation kernels of equation (9) are mapped to the VLSI architectures based on time-recursive lattice structure as shown in FIG. 1. As the shown of the FIG. 1, the input data are separated into two phases, the real parts $X_r(k)$ and the imaginary parts $X_i(k)$ where k=0, 1, ..., N−1. The real parts $X_r(k)$, first phase, are first fed to the module. After N iterations, the $MDCT_r(n)$ is obtained at upper output. The imaginary parts $X_i(k)$, second phase, are then fed to the lattice. Similarly, after N iterations, the $MDST_i(n)$ is obtained at lower output. Then, the $MDCT_r(n)$ and the $MDST_i(n)$ are combined together to obtain the IFFT answer of a 2N samples sequence by the accumulators in post-processing circuit. The overall architecture disclosed by U.S. Pat. No. 6,157,938 is illustrated in the FIG. 2.

Figure 2:
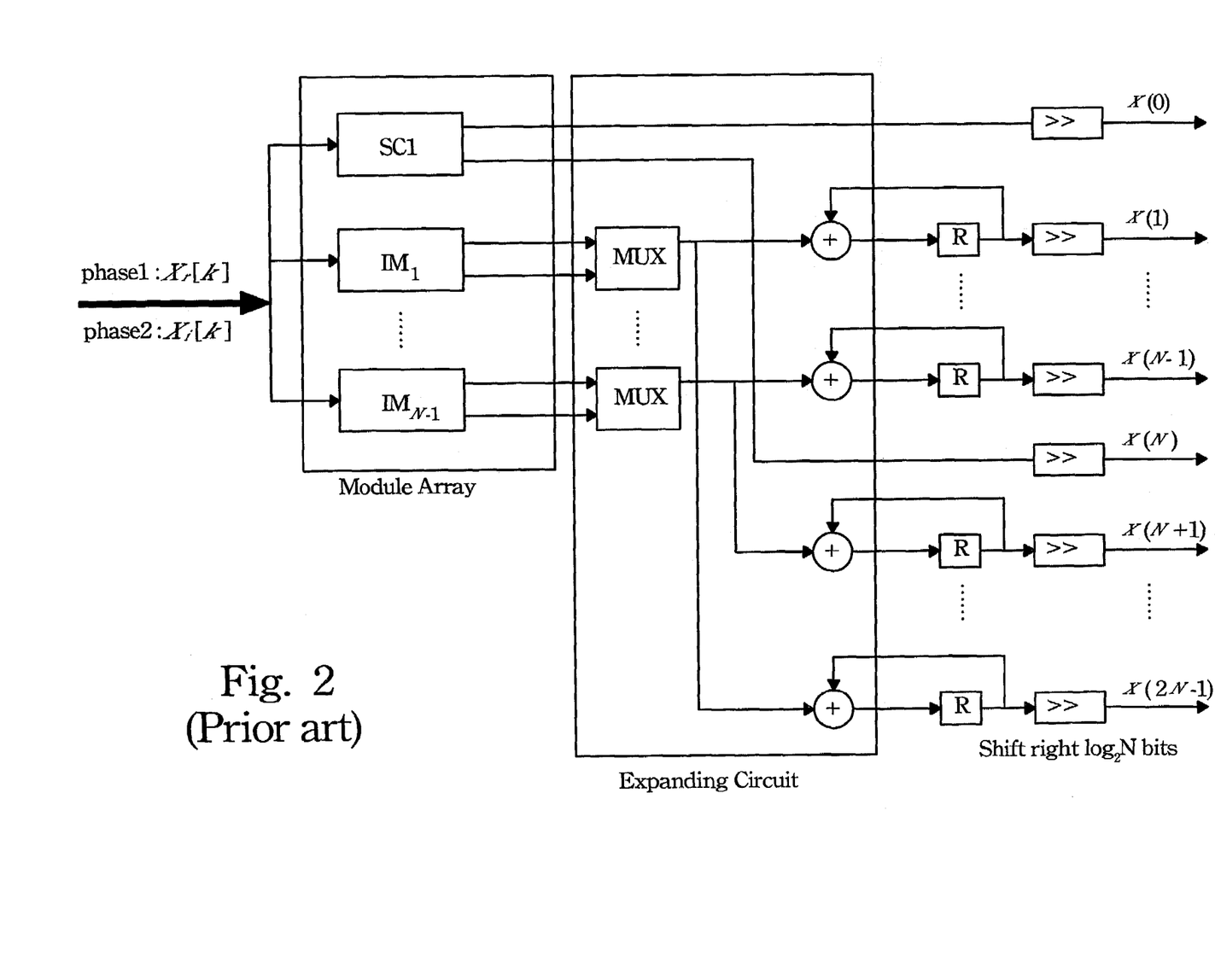
FIG. 2 is a diagram showing the overall structure of an IFFT module of the prior art.

However, in FIG. 2, the input data are decomposed into real part $X_r(k)$ and imaginary part $X_i(k)$ and they are fed into the modules in two different phases. The real part $X_r(k)$ and imaginary part $X_i(k)$ respectively require N iterations to get the $MDCT_r(n)$ and the $MDST_i(n)$. Namely, 2N iterations are required to obtain the final results x(n), which results in extra N-cycle latency in practical implementations. Thus, there is an ongoing need to reduce the number of IFFT computations, and in particular the number of complex multiplications, that must be performed in order to more efficiently compute the IFFT.

SUMMARY OF THE INVENTION

The present invention meets this need and significantly reduces the number of complex computations that must be performed in computing the IFFT of real value sequences. The computational reduction increases signal processing speed and decreases power consumption, both of which are highly desirable in virtually every IFFT application. The present invention achieves these goals by taking advantage of various symmetries and regularities of processed data sequences.

The main purpose of the present invention is to provide a novel pre-processing scheme to modify the IFFT structure. By exploiting the symmetric and anti-symmetric properties of the input sequences, it can eliminate the redundant output from the lattice modules, and the required iteration number can be halved. The present invention may reduce the computational complexity and save the total hardware complexity.

In accordance with the present invention, an input data sequence is modified by exploiting the symmetric and anti-symmetric properties in order to eliminate the redundant output from the lattice modules. Then, an IFFT is performed on the modified input data sequence to generate a transformed sequence.

To achieve the foregoing objects, reducing the total iteration number of the IFFT structure, first using the symmetric and anti-symmetric properties to modify the real and imaginary part of the input signal and then mixing them together by an adder and feeding the results into the lattice module. Through the symmetric and anti-symmetric properties, the redundant terms may be eliminated. Because the real and imaginary part are mixed together for feeding into the lattice modules, only N iterations are required to obtain the final result, which reduces power consumption. On the other hand, the expanding circuit of the present invention does not include the multiplexers; therefore, it may reduce the complexity of the circuit design.

BRIEF DESCRIPTION OF THE DRAWINGS

The objects, features and advantages of this invention will be more clearly understood from the following detailed description taken in conjunction with the accompanying drawings in which.

DESCRIPTION OF THE PREFERRED EMBODIMENT

Without limiting the spirit and scope of the present invention, the method proposed in the present invention is illustrated with one preferred embodiment to provide a novel pre-processing scheme to modify the input sequences. By exploiting the symmetric and anti-symmetric properties of the input sequences, it can eliminate the redundant output from the lattice modules, and the required iteration number can be halved. Skilled artisans, upon acknowledging the embodiments, can apply the method according to the present invention to time-recursive IFFT structure to reduce the operation frequency. Realizing the present invention method in a circuit may reduce the power consumption and the complexity of the circuit. The application of the present invention is not limited by the following embodiment.

A preferred embodiment of the present invention provides efficient or simplified IFFT/FFT computations by taking advantage of Hermitian symmetry. In the formal definition of the IFFT/FFT, both x(n) and X(k) are assumed to be complex. If X(k) is an N-point Hermitian symmetric series, the Fourier transformation of X(k) is a real sequence, x(n). Regarding subscripts, the index for frequency sequences is k, sequences in the time domain are indexed by n.

In accordance with the preferred embodiment of the present invention, an assumption is made that a 512-point IFFT/FFT module is required to perform the modulation/demodulation kernel. If X(k) is a 2N (N=256) point Hermitian symmetric series, the inputs of the IFFT have the constraint $X(k)=X^*(2N-k)$ for $k=0, 1, \ldots, N-1$ where N=256 and $X(k) \equiv X_r(k) + j \cdot X_i(k)$ wherein X(0)=X(N)=0. Here, $X_r(k)$ and $X_i(k)$ indicate the real part and imaginary part of X(k) respectively. As defined in equation (2), the IDFT of a 2N samples sequence is $$x(n) = \frac{1}{2N} \sum_{k=0}^{2N-1} X(k) W_{2N}^{-kn} \quad \text{for } n = 0, 1, \ldots, 2N-1$$

wherein $$W_{2N}^{-nk} \equiv e^{j2\pi nk/2N} = \cos\frac{2\pi nk}{2N} + j\sin\frac{2\pi nk}{2N}$$

By decomposing k into the first half and the second half and using the facts that X(0)=X(N)=0, $$x(n) = \frac{1}{2N}\left[\sum_{k=1}^{N-1} X(k) W_{2N}^{-nk} + \sum_{k=1}^{2N-1} X(k) W_{2N}^{-nk}\right]$$

$$= \frac{1}{2N}\left[\sum_{k=1}^{N-1} X(k) W_{2N}^{-nk} + \sum_{k=1}^{N-1} X(2N-k) W_{2N}^{-n(2N-k)}\right]$$

Wherein $$W_{2N}^{-n(2N-k)} \equiv W_{2N}^{-n(2N)} \cdot W_{2N}^{nk} \equiv e^{j2\pi n 2N/2N} \cdot W_{2N}^{nk}$$

$$= 1 \cdot W_{2N}^{nk}$$

$$= W_{2N}^{nk}$$

and $X(2N-k) = X*(k)$

Therefore, $$x(n) = \frac{1}{2N}\left[\sum_{k=1}^{N-1} X(k) W_{2N}^{-kn} + \sum_{k=1}^{N-1} X*(k) W_{2N}^{nk}\right]$$

Accordingly, $X(k) \equiv X_r(k) + j \cdot X_i(k)$ $X*(k) \equiv X_r(k) - j \cdot X_i(k)$ Therefore, $$x(n) = \frac{1}{2N}\left[\sum_{k=1}^{N-1} X(k) W_{2N}^{-kn} + \sum_{k=1}^{N-1} X*(k) W_{2N}^{nk}\right]$$

$$= \frac{1}{N}\sum_{k=1}^{N-1}\left[X_r(k)\cos\frac{2\pi nk}{2N} - \sum_{k=1}^{N-1} X_i(k)\sin\frac{2\pi nk}{2N}\right]$$

$$= \frac{1}{N}\sum_{k=1}^{N-1}[MDCT_r(n) - MDST_i(n)] \quad \text{for } n = 0, 1, \ldots, 2N-1$$

wherein $$MDCT_r(n) = \sum_{k=1}^{N-1} X_r(k)\cos\frac{2\pi nk}{2N}$$

$$MDST_i(n) = \sum_{k=1}^{N-1} X_i(k)\sin\frac{2\pi nk}{2N}$$

From the above equation, it can be determined that inverse Fast Fourier Transformation calculations include two-part operations of real numbers, where the first part is a discrete cosine transform-like operation with $X_r(k)$ (wherein k=0, 1, . . . , N−1) as input, whereas the second part is a discrete sine transform-like operation with $X_i(k)$ (wherein k=0, 1, . . . , N−1) as input. The subscripts r and i indicate that the operations are performed on the real and imaginary parts of input symbol X(k), respectively. For simplicity, the first part of above equation is defined as a modified discrete cosine transformation ($MDCT_r$) function and the second part as a modified sine transformation ($MDST_i$) function.

However, in accordance with the prior art, the inverse Fast Fourier Transformation calculations may be determined by calculating the $MDCT_r(n)$ function and $MDST_i(n)$ function where n=0, 1, . . . , N−1. Namely, 2N iterations are required to obtain the final inverse Fast Fourier Transformation calculations results, which result in extra N-cycle latency in practical implementations.

Therefore, to reduce the total iteration number of the inverse Fast Fourier Transformation calculations, the $X_r(k)$ and $X_i(k)$ are mixed together to be fed into the lattice module. Since the lattice module is a linear system, based on superposition theory, the superposition input obtains the superposition outputs after N iterations. Because the imaginary parts are input together, the upper output of the lattice module includes the desired value $MDCT_r(n)$ and the additional value $MDCT_i(n)$. Similarly, because the real parts are input together, the lower output of the lattice module includes the desired value $MDST_i(n)$ and the additional value named $MDST_r(n)$.

In other words, the upper output is as follows:

the upper output=$MDCT_r(n)+MDCT_i(n)$

And the lower output is as follows:

the lowwer output=$MDST_r(n)+MDST_i(n)$

Note that the terms $MDCT_i(n)$, and $MDST_r(n)$ are not the desired results. They are mixed with the desired part.

The considered reduction in the number of the iterations is achieved by deleting the undesired part, $MDCT_i(n)$ and $MDST_r(n)$. First, in accordance with the relationship is shown in the follows.

$$MDCT_r(n) = \sum_{k=0}^{N-1} X_r(k)\cos\frac{2\pi nk}{2N}$$

$$MDST_i(n) = \sum_{k=0}^{N-1} X_i(k)\sin\frac{2\pi nk}{2N}$$

The sequence cos(2πnk/2N and the sequence sin(2πnk/2N) exhibits symmetric and anti-symmetric characteristics in accordance with the "n" value, which is odd or even.

Figure 3:
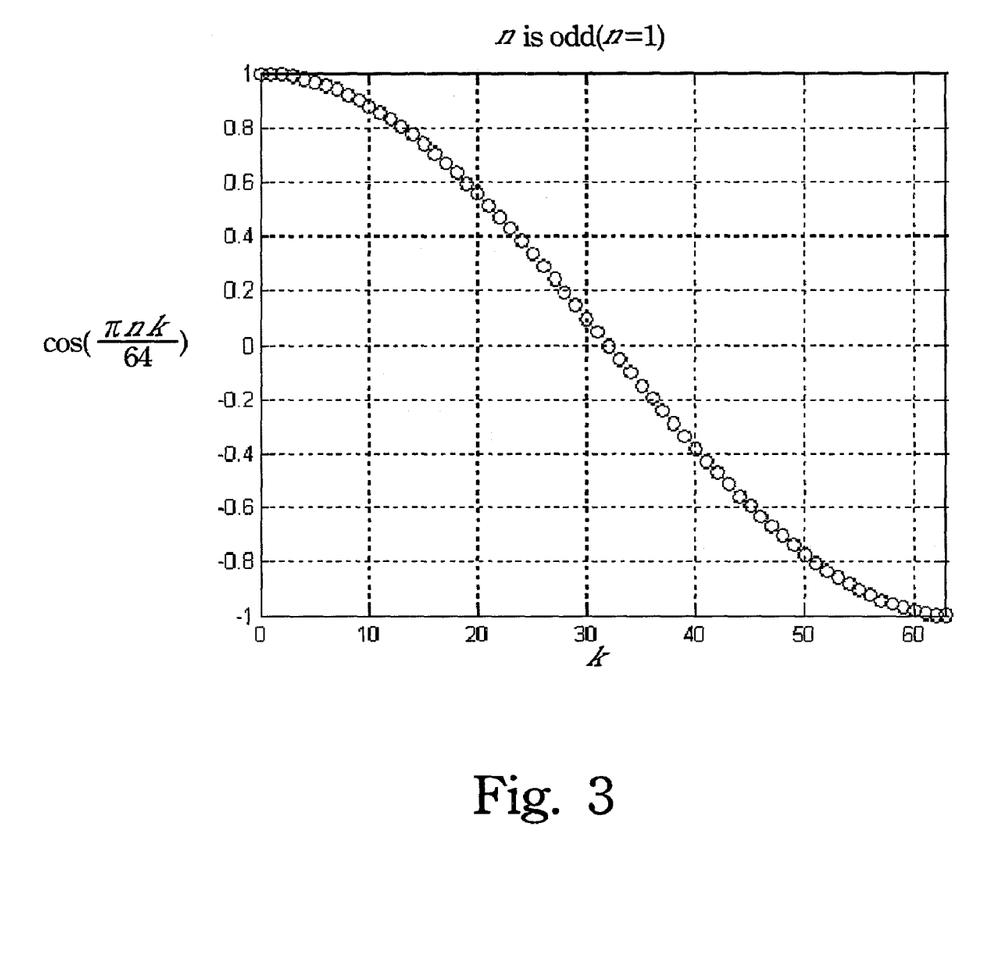
FIG. 3 shows a cos(2πnk/2N) diagram when n is odd in accordance with the present invention and the transverse axle represents the k value.

When n is odd, assuming N=64, n=1

$$\cos\frac{2\pi nk}{2N} = \cos\frac{\pi \cdot 1 \cdot k}{64}$$

FIG. 3 shows the diagram of the above equation, wherein the transverse axle represents the k value. FIG. 3 shows an anti-symmetrical diagram relative to the k=32 point. Namely, the cos(2πnk/2N) will be an anti-symmetrical sequence when n is odd.

Figure 4:
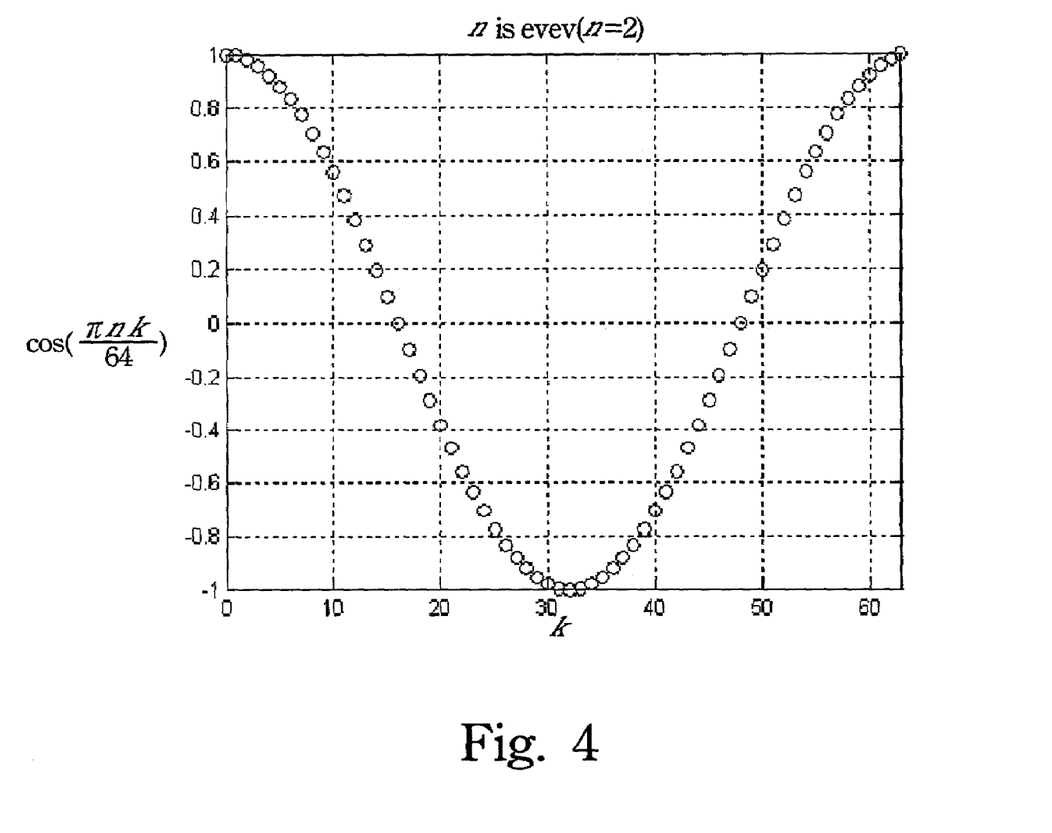
FIG. 4 shows a cos(2πnk/2N) diagram when n is even in accordance with the present invention and the transverse axle represents the k value.

On the other hand, when n is even, assuming N=64, n=2

$$\cos\frac{2\pi nk}{2N} = \cos\frac{\pi \cdot 2 \cdot k}{64}$$

FIG. 4 shows the diagram of the above equation, wherein the transverse axle represents the k value. FIG. 4 shows a symmetrical diagram relative to the k=32 point. Namely, the $\cos(2\pi nk/2N)$ will be a symmetrical sequence when n is even.

Consider a symmetric sequence; $Y_s(k)$, the product $Y_s(k)$ with the anti-symmetrical sequence $\cos(2\pi nk/2N)$ will form a new anti-symmetric sequence, $Y_s(k)\cos(2\pi nk/2N)$. The summation of the product will be zero when n is odd.

$$\sum Y_s(K) \cdot \cos\left(\frac{2\pi nk}{2N}\right) = 0 \quad n = \text{odd}$$

On the other hand, consider an anti-symmetric sequence, $Y_a(k)$; the product $Y_a(k)$ with the symmetries sequence $\cos(2\pi nk/2N)$ will form a new anti-symmetric sequence, $Y_a(k)\cos(2\pi nk/2N)$. The summation of the product will be zero when n is even.

$$\sum Y_a(K) \cdot \cos\left(\frac{2\pi nk}{2N}\right) = 0 \quad n = \text{even}$$

Similarly, the sequence $\sin(2\pi nk/2N)$ also exhibits the symmetric and anti-symmetric characteristic in accordance with the "n" value, which is odd or even.

Figure 5:
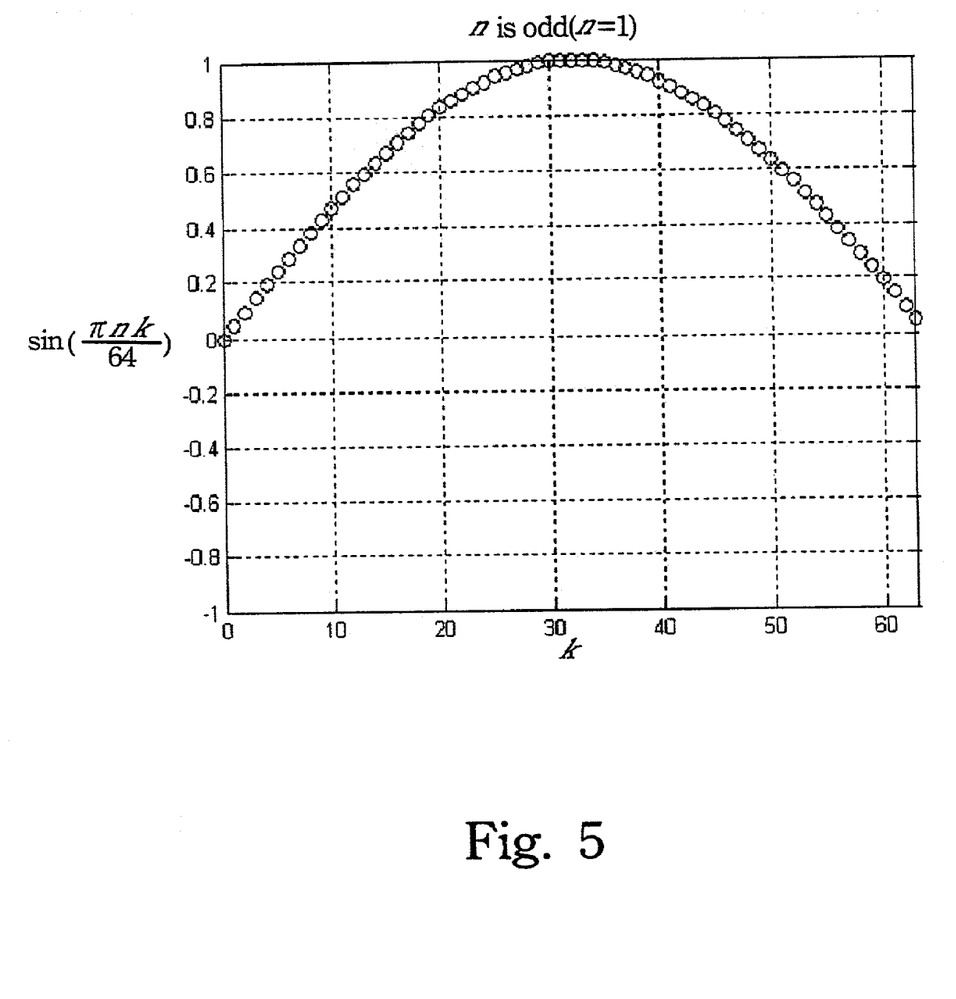
FIG. 5 shows a sin(2πnk/2N) diagram when n is odd in accordance with the present invention and the transverse axle represents the k value.

When n is odd, assuming N=64, n=1

$$\sin\frac{2\pi nk}{2N} = \sin\frac{\pi \cdot 1 \cdot k}{64}$$

FIG. 5 shows the diagram of the above equation, wherein the transverse axle representing the k value. FIG. 5 shows a symmetrical diagram relative to the k=32 point. Namely, the $\sin(2\pi nk/2N)$ will be a symmetrical sequence when n is odd.

Figure 6:
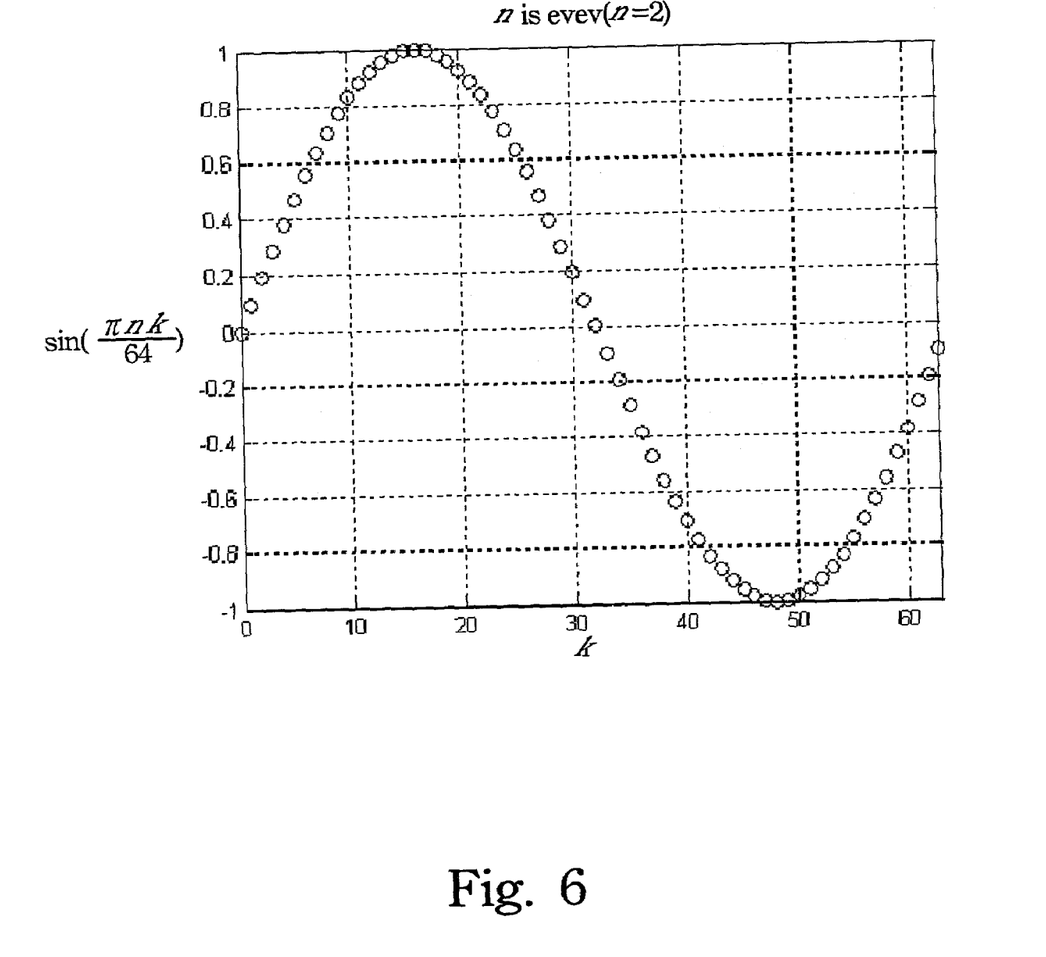
FIG. 6 shows a sin(2πnk/2N) diagram when n is even in accordance with the present invention and the transverse axle represents the k value.

On the other hand, when n is even, assuming N=64, n=2

$$\sin\frac{2\pi nk}{2N} = \sin\frac{\pi \cdot 2 \cdot k}{64}$$

FIG. 6 shows the diagram of the above equation, wherein the transverse axle representing the k value. FIG. 6 shows an anti-symmetric diagram relative to the k=32 point. Namely, the $\sin(2\pi nk/2N)$ will be an anti-symmetric sequence when n is even.

Consider an anti-symmetric sequence, $Y_a(k)$, the product $Y_a(k)$ with the symmetrical sequence $\sin(2\pi nk/2N)$ forms a new anti-symmetric sequence, $Y_a(k)\sin(2\pi nk/2N)$. The summation of the product is zero when n is odd.

$$\sum Y_a(k) \cdot \sin\frac{2\pi nk}{2N} = 0 \quad n = \text{odd}$$

On the other hand, consider a symmetric sequence; $Y_s(k)$, the product $Y_s(k)$ with the anti-symmetrical sequence $\sin(2\pi nk/2N)$ forms a new anti-symmetric sequence, $Y_s(k)\sin(2\pi nk/2N)$. The summation of the product is zero when n is even.

$$\sum Y_s(k) \cdot \sin\frac{2\pi nk}{2N} = 0 \quad n = \text{even}$$

Now, consider the upper output, namely, if the $X_r(k)$ and $X_i(k)$ are mixed together to be fed into the lattice module, the upper output is as follows:

the upper output = $MDCT_r(n) + MDCT_i(n)$ and $$MDCT_r(n) = \sum_{k=0}^{N-1} X_r(k)\cos\frac{2\pi nk}{2N}$$

$$MDCT_i(n) = \sum_{k=0}^{N-1} X_i(k)\cos\frac{2\pi nk}{2N}$$

the lower output is as follows:

the lower output = $MDST_r(n) + MDST_i(n)$ and $$MDST_r(n) = \sum_{k=0}^{N-1} X_r(k)\sin\frac{2\pi nk}{2N}$$

$$MDST_i(n) = \sum_{k=0}^{N-1} X_i(k)\sin\frac{2\pi nk}{2N}$$

The $MDCT_r(n)$ and $MDST_i(n)$ are the desired parts and the $MDCT_i(n)$ and $MDST_r(n)$ should be deleted. Therefore, by changing the $X_i(k)$ to an even function or odd function, the $MDCT_i(n)$ may be deleted.

Accordingly, if the input sequence X(k), k=0, 1, ... N−1, is a random sequence and $X_r(k)$ and $X_i(k)$ indicate the real part and imaginary parts of X(k). Since any sequence can be decomposed into a symmetric part and anti-symmetric part, we decompose the imaginary part $X_i(k)$ according to an identified modification pattern into the following equations:

symmetric signal: $X_{is}(k)=X_i(k)+X_i(N-k)$      (i)

anti-symmetric signal: $X_{ia}(k)=X_i(k)-X_i(N-k)$      (ii)

Therefore, for eliminating the redundant term, $MDCT_i(n)$, from the upper output, when n is odd, the $\cos(2\pi nk/2N)$ will be an anti-symmetrical sequence. Therefore, the symmetries sequence $X_{is}(k)$ is sent into the module to make the $MDCT_i(n)$ zero. On the other hand, when n is even, the $\cos(2\pi nk/2N)$ will be a symmetries sequence. Therefore, the anti-symmetrical sequence $X_{ia}(k)$ is sent into the module to make the $MDCT_i(n)$ be zero. However, because the input signal $X_i(k)$ is changed, the lower output $MDST_i(n)$ will be as follows:

When $n$ is odd $$\sum_{k=0}^{N-1} X_{is}(k)\sin\frac{2\pi nk}{2N} = \sum_{k=0}^{N-1} [X_i(k) + X_i(N-k)] \cdot \sin\frac{2\pi nk}{2N}$$

$$= \sum_{k=0}^{N-1} X_i(k) \cdot \sin\frac{2\pi nk}{2N} + \sum_{k=0}^{N-1} X_i(N-k) \cdot \sin\frac{2\pi nk}{2N}$$

$$= \sum_{k=0}^{N-1} X_i(k) \cdot \sin\frac{2\pi nk}{2N} + \sum_{k=0}^{N-1} X_i(N-k) \cdot \sin\frac{2\pi n(N-k)}{2N}$$

$$= 2\,MDST_i(n)$$

When $n$ is even $$\sum_{k=0}^{N-1} X_{ia}(k)\sin\frac{2\pi nk}{2N} = \sum_{k=0}^{N-1} [X_i(k) - X_i(N-k)] \cdot \sin\frac{2\pi nk}{2N}$$

$$= \sum_{k=0}^{N-1} X_i(k) \cdot \sin\frac{2\pi nk}{2N} - \sum_{k=0}^{N-1} X_i(N-k) \cdot \sin\frac{2\pi nk}{2N}$$

$$= \sum_{k=0}^{N-1} X_i(k) \cdot \sin\frac{2\pi nk}{2N} + \sum_{k=0}^{N-1} X_i(N-k) \cdot \sin\frac{2\pi n(N-k)}{2N}$$

$$= 2\,MDST_i(n)$$

The desired result, $MDST_i(n)$, is kept. At the same time, the redundant term $MDCT_i(n)$ may also be eliminated. Therefore, in accordance with the foregoing description, the input imaginary sequence, $X_i'(k)$, is modified according to an identified modification pattern as follows:

$$X_i'(k) = X_i(k) + (-1)^{n+1} \cdot X_i(N-k)$$

On the other hand, considering the lower output.

the lower output $= MDST_r(n) + MDST_i(n)$

And $$MDST_r(n) = \sum_{k=0}^{N-1} X_r(k)\sin\frac{2\pi nk}{2N}$$

$$MDST_i(n) = \sum_{k=0}^{N-1} X_i(k)\sin\frac{2\pi nk}{2N}$$

The $MDST_i(n)$ are the desired parts and the $MDST_r(n)$ should be deleted. Therefore, by changing the $X_r(k)$ to an even function or an odd function, the $MDST_r(n)$ may be deleted.

Similarly, since any sequence can be decomposed into a symmetric part and an anti-symmetric part, we decompose the real $X_r(k)$ according to a modification identified pattern into the following:

symmetric signal: $X_{rs}(k) = X_r(k) + X_r(N-k)$ (i)

anti-symmetric signal: $X_{ra}(k) = X_r(k) - X_r(N-k)$ (ii)

Therefore, for eliminating the redundant term, $MDST_r(n)$, from the lower output, when $n$ is odd, the $\sin(2\pi nk/2N)$ will be a symmetrical sequence. Therefore, the anti-symmetrical sequence $X_{ra}(k)$ is sent into the module to make the $MDST_r(n)$ zero. On the other hand, when $n$ is even, the $\sin(2\pi nk/2N)$ will be an anti-symmetrical sequence. Therefore, the symmetrical sequence $X_{rs}(k)$ is sent into the module to make the $MDST_r(n)$ zero. However, because the input signal $X_r(k)$ is changed, the upper output $MDCT_r(n)$ is as follows:

When $n$ is odd $$\sum_{k=0}^{N-1} X_{ra}(k)\cos\frac{2\pi nk}{2N} = \sum_{k=0}^{N-1} [X_r(k) - X_r(N-k)] \cdot \cos\frac{2\pi nk}{2N}$$

$$= \sum_{k=0}^{N-1} X_r(k) \cdot \cos\frac{2\pi nk}{2N} - \sum_{k=0}^{N-1} X_r(N-k) \cdot \cos\frac{2\pi nk}{2N}$$

$$= \sum_{k=0}^{N-1} X_r(k) \cdot \cos\frac{2\pi nk}{2N} + \sum_{k=0}^{N-1} X_r(N-k) \cdot \cos\frac{2\pi n(N-k)}{2N}$$

$$= 2\,MDCT_r(n)$$

When $n$ is even $$\sum_{k=0}^{N-1} X_{rs}(k)\cos\frac{2\pi nk}{2N} = \sum_{k=0}^{N-1} [X_r(k) + X_r(N-k)] \cdot \cos\frac{2\pi nk}{2N}$$

$$= \sum_{k=0}^{N-1} X_r(k) \cdot \cos\frac{2\pi nk}{2N} + \sum_{k=0}^{N-1} X_r(N-k) \cdot \cos\frac{2\pi nk}{2N}$$

$$= \sum_{k=0}^{N-1} X_r(k) \cdot \cos\frac{2\pi nk}{2N} + \sum_{k=0}^{N-1} X_r(N-k) \cdot \cos\frac{2\pi n(N-k)}{2N}$$

$$= 2\,MDCT_r(n)$$

The desired result, $MDCT_r(n)$ is kept. At the same time, the redundant term $MDST_r(n)$ may also be eliminated. Therefore, in accordance with the foregoing description, the input real sequence $X_r'(k)$, is modified according to the identified modification pattern as follows:

$$X_r'(k) = X_r(k) + (-1)^n \cdot X_r(N-k)$$

As a result, the real sequence with the imaginary sequence may be added together to feed into the lattice module simultaneously to obtain the correct result. In summary, the generalized input sequence X $$X'(k) = X_r'(k) + X_i'(k)$$

$$= [X_r(k) + (-1)^n \cdot X_r(N-k)] + [X_i(k) + (-1)^{n+1} \cdot X_i(N-k)]$$

Figure 7:
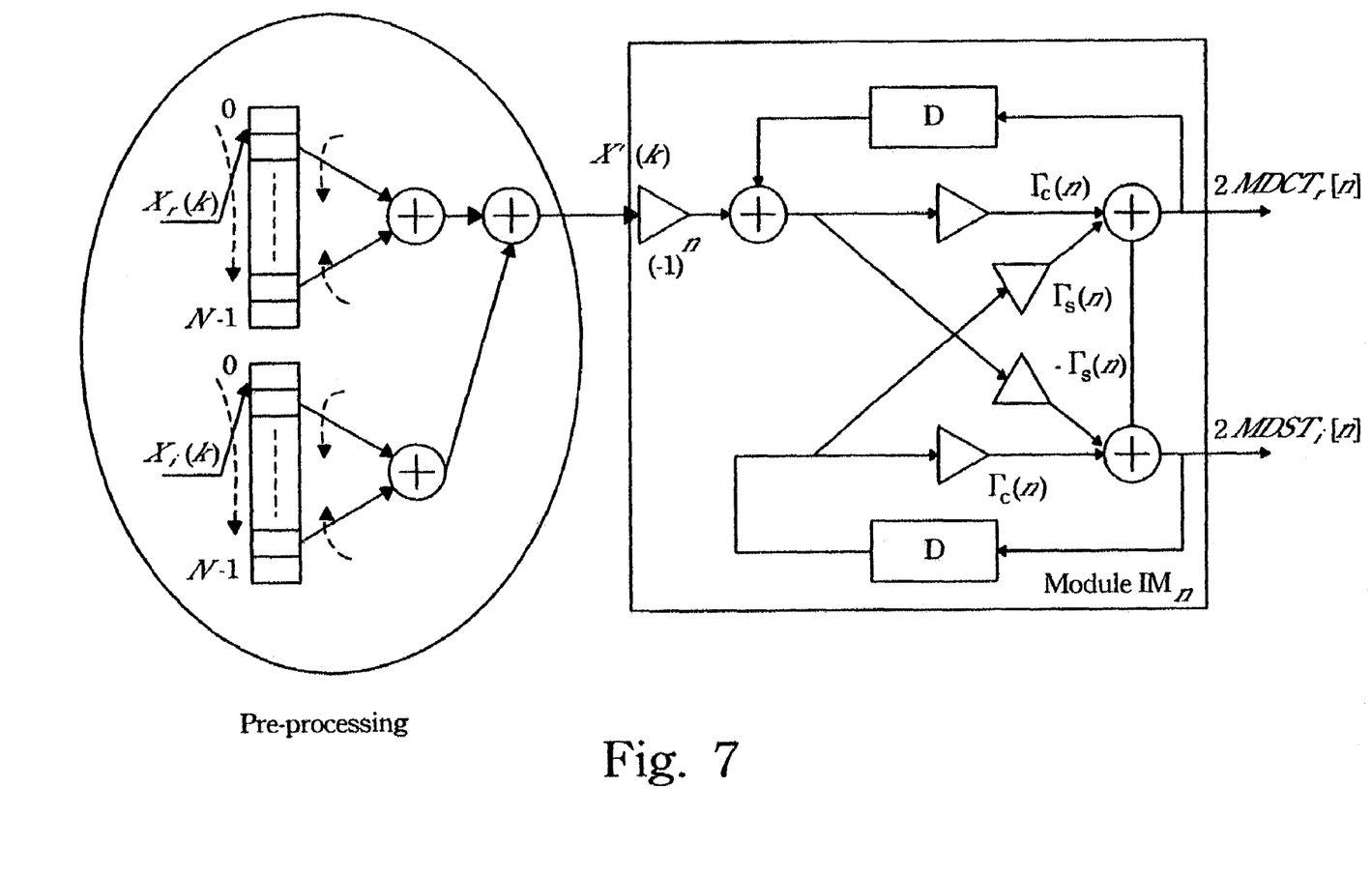
FIG. 7 is a detailed circuit diagram showing a detailed circuit diagram of the lattice modules for generation of the $2MDCT_r(n)$ and the $2MDST_i(n)$ in accordance with the present invention.

(k), can be expressed as follows:

The symmetric/anti-symmetric sequences of input data can be easily generated by a pre-processing module, which consists of some buffers and adders as shown in FIG. 7. In general, this pre-processing module may be moved to previous functional block of DMT system, i.e., the constellation encoder. Usually, the encoder is implemented by a DSP processor that is very efficient for data movement and addition operations. Hence, we can implement the pre-processing module in DSP, which helps to further reduce the hardware complexity.

Figure 8:
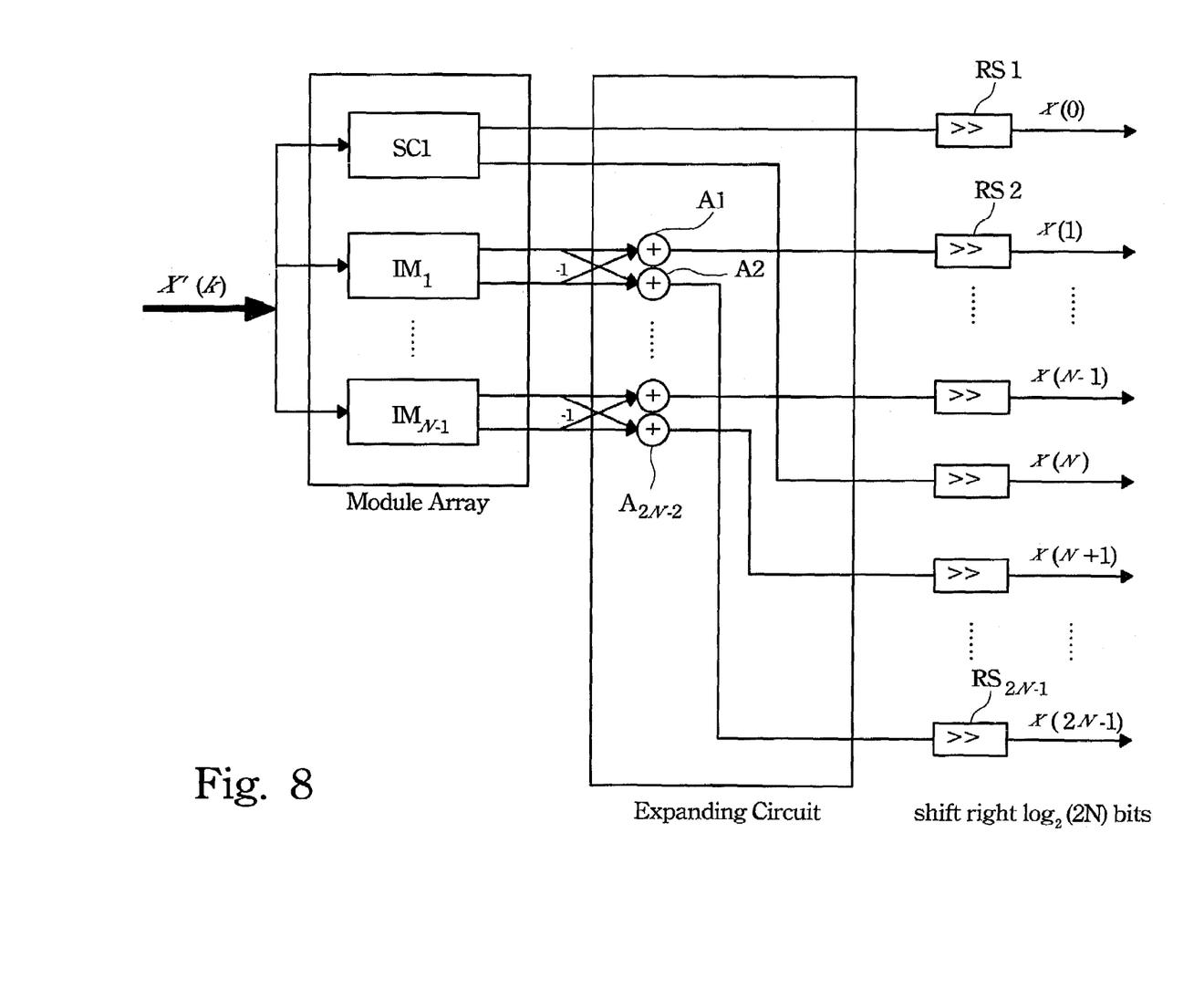
FIG. 8 is a diagram showing the overall structure of an IFFT module in accordance with the present invention.

The overall inverse Fast Fourier Transformation lattice structure is drawn in FIG. 8 and should be compared with FIG. 2, proposed by U.S. Pat. No. 6,157,938, where the N−1 multiplexers and 2N−2 accumulators are in an expanding circuit and the multiplexers $MUX_1$ to $MUX_{N-1}$ are for receiving the output data from lattice module $IM_1$ to $IM_{N-1}$, respectively. For example, the multiplexer $MUX_1$ receives the output data MDCT(1) and MDST(1) of the lattice module $IM_1$. Similarly, the multiplexer $MUX_{N-1}$ receives the output data MDCT(N−1) and MDST(N−1) of the lattice module $IM_{N-1}$.

However, in accordance with the present invention, it is not necessary to use the multiplexers in the expanding circuit because the present invention provides a modified input sequence that can eliminate the redundant output. Reference is again made to FIG. 8, where the expanding circuit only includes 2N−2 adders. The adders $A_1$ to $A_{2N-2}$ are for receiving the output data from lattice module $IM_1$ to $IM_{N-1}$, respectively. For example, the adder $A_1$ receives the output data 2MDCT(1) and 2MDST(1) of the lattice module $IM_1$. Similarly, the adder $A_{2N-1}$ receives the output data $2MDCT_r(N-1)$ and $2MDST_i(N-1)$ of the lattice module $IM_{N-1}$. In accordance the following equation:

$$x(1) = \frac{1}{2N}[2MDCT_r(1) - 2MDST_i(1)]$$

Therefore, the output $2MDST_i(1)$ is multiplied by (−1). Furthermore, since the output of the lattice module further includes a multiplication of 2, the data output from the expanding circuit is shifted right by $\log_2(2N)$ bits by the corresponding hard-wiring right shifters for outputting data x(0), x(1), x(2), . . . , x(2N−1).

On the other hand, the MDCT function and MDST function demonstrate the following characteristic:

$MDCT(k)=MDCT(2N-k)$ $MDST(k)=-MDST(2N-k)$

Therefore, the expanding circuit may extend the calculations of MDCT(k) and MDST(k) in k=N, N+1, . . . , 2N−1. The following is an example.

$$x(2N - 1) = MDCT(2N - 1) - MDST(2N - 1)$$
$$= MDCT(1) + MDST(1)$$

The two outputs of lattice module $IM_1$ may also get the x(2N−1) result. In other words, the adder $A_2$ receives the output data 2MDCT(1) and 2MDST(1) of the lattice module $IM_1$ and connects to the corresponding hard-wiring right shifter to get the output x(2N−1).

Moreover, in accordance with the following equation:

$x(0)=MDCT(0)-MDST(0)=MDCT(0)$ $x(N)=MDCT(N)-MDST(N)=(-1)^n MDCT(N)$

Therefore, x(0) and x(N) may be outputted respectively from the two terminals of the special module SC1.

In the following, the present invention architecture of Fast Fourier Transformation is compared with the prior art of U.S. Pat. No. 6,157,938. The hardware complexity of hardware is shown in Table 1, where the halved iteration number is the major improvement in this present invention. Under the same symbol rate, the power consumption of the IFFT can be reduced due to the halved processing speed. Besides, the numbers of multiplexer and register are also reduced after the modification.

TABLE 1

|  | Original structure (US 6157938) | Proposed structure |
|---|---|---|
| Multiplier | 4N-4 | 4N-4 |
| Adder | 5N-3 | 5N-3 |
| Register | 4N-4 | 2N-2 |
| Others | N-1 MUXs | — |
| Iteration | 2N | N |

A 2N-point Fast Fourier Transformation realized with a prior art structure includes one special module (SC1) and the (N−1) lattice modules $IM_1$ to $IM_{N-1}$. The special module SC1 includes two adders and each of the (N−1) lattice modules includes four real multipliers, three real adders and two registers. Therefore, the total (3N−1) adders, (4N−4) multipliers and (2N−2) registers are required for the (N−1) lattice modules and SC1. Besides, the expanding circuit includes additional 2(N−1) adders, (N−1) multiplexers and 2(N−1) registers. That is, the original structure requires 4(N−1) real multipliers and [5(N−1)+2] real adders in total.

On the other hand, the structure of the present invention also includes one special module (SC1) and the (N−1) lattice modules $IM_1$ to $IM_{N-1}$. The main different between the prior art and the present invention is the expanding circuit. It only requires (2N−2) adders. The multiplexers and the registers are not necessary. Therefore, the present invention may reduce the hardware complexity of the expanding circuit. More importantly, the iteration may also be reduced from 2N to N.

Figure 9:
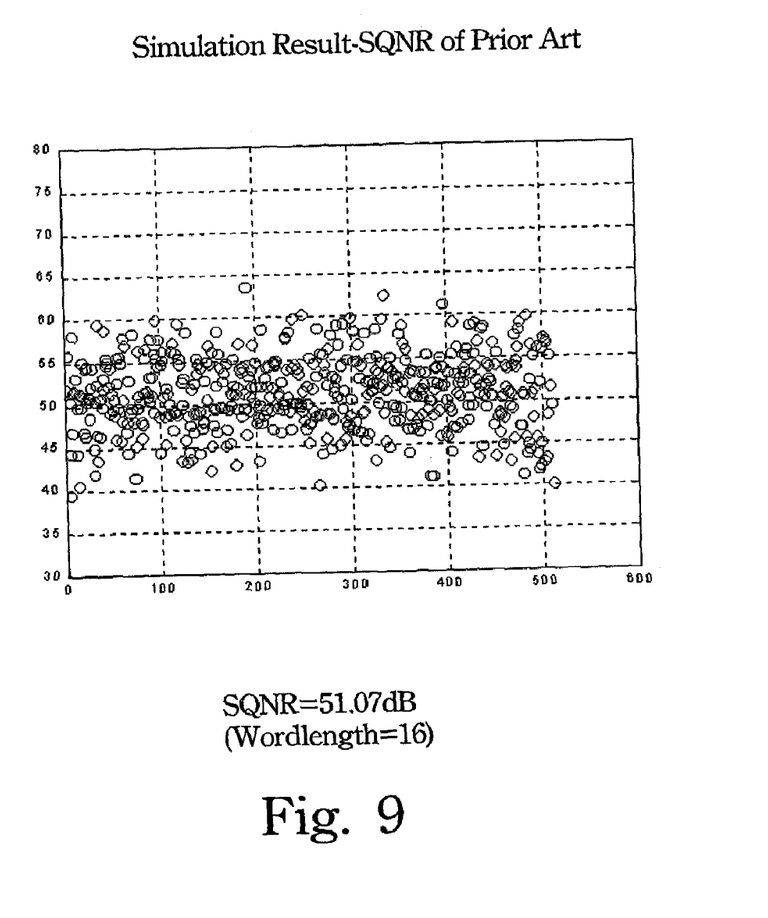
FIG. 9 is the SQNR performances of the prior art structure shown in FIG. 1.
Figure 10:
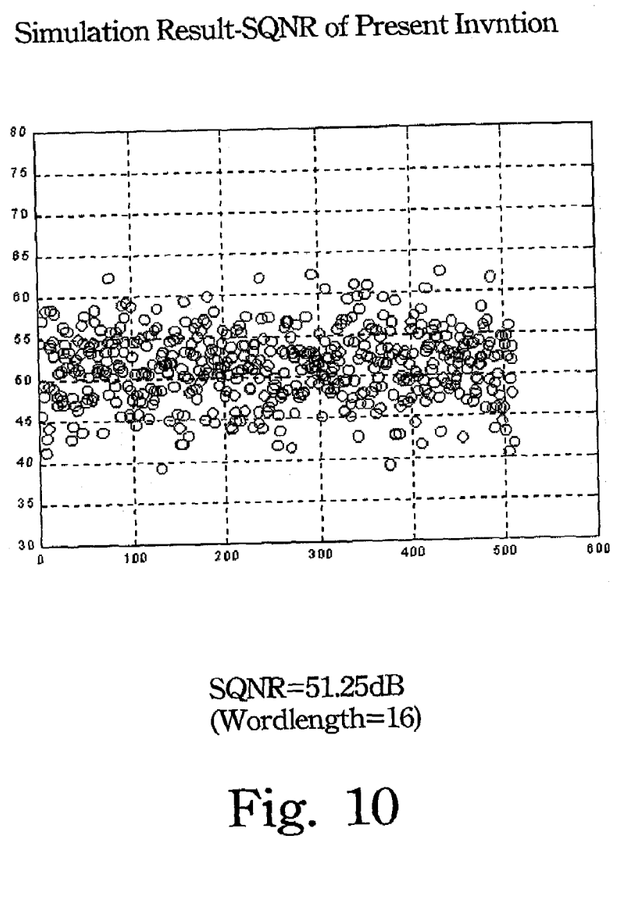
FIG. 10 is the SQNR performances of the present invention structure shown in FIG. 7.
Figure 11:
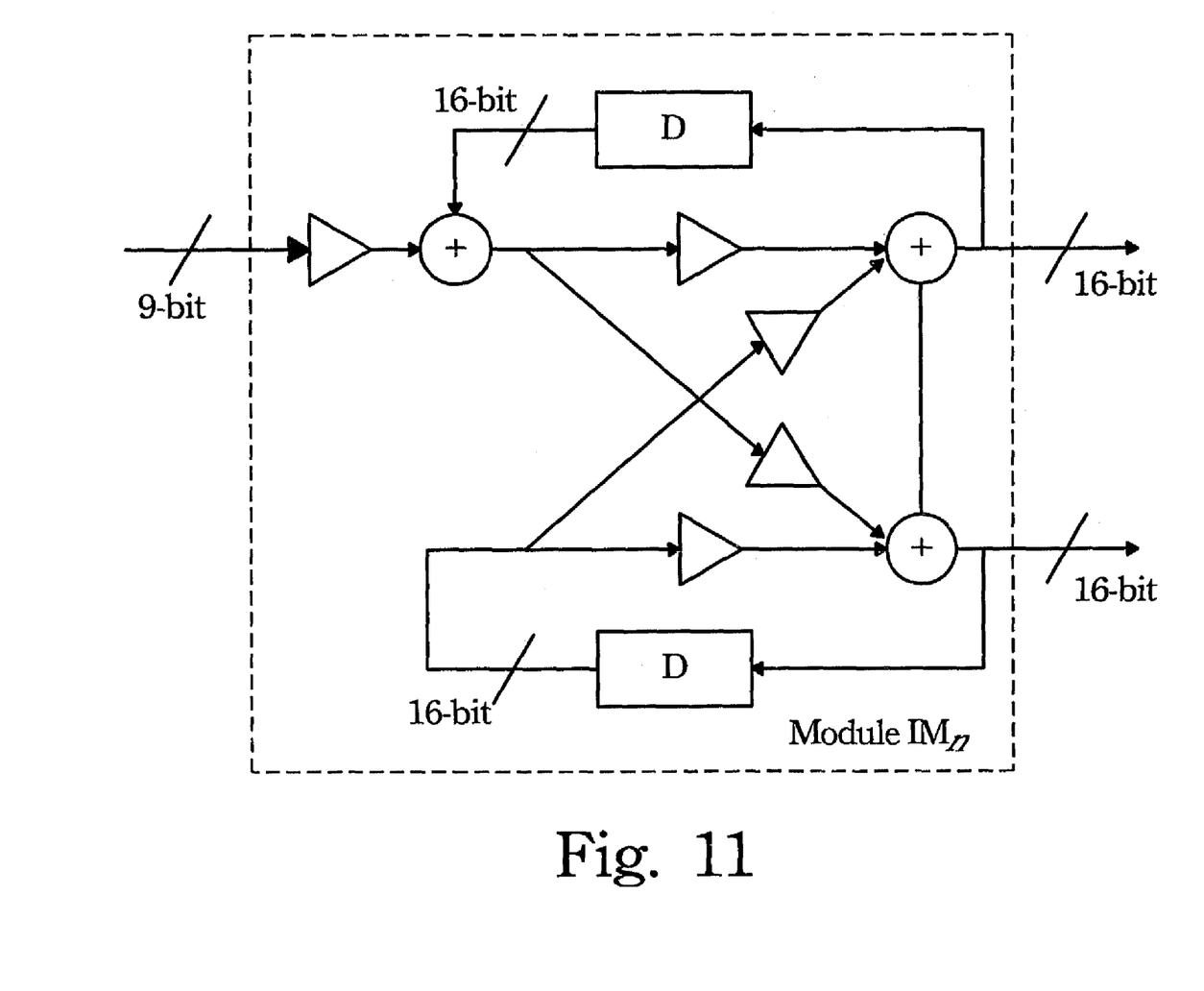
FIG. 11 is the internal wordlength of the lattice module.

FIG. 9 and FIG. 10 are the SQNR performances of the prior art structure (U.S. Pat. No. 6,157,938) and the present invention structure, respectively. The internal wordlength was chosen as shown in FIG. 11. Two 16-bit adders and four 16-bit multipliers were adopted in the simulation. From the two drawings, FIG. 9 and FIG. 10, under the same wordlength assignment, the present invention architecture performs as well as the prior art structure. Most channels result in a SQNR more than 40 dB, and the overall averaged SQNR value is 51.25 dB, which is almost identical to the value of the prior art structure (51.07 dB).

By utilizing the symmetric/anti-symmetric property of the data sequence, a more effective lattice structure for an IFFT module in a DMT transmitter is proposed. The iteration number has been halved such that the lattice module can work at a half clock rate. Hence, the power consumption can be reduced. On the other hand, the hardware in the expanding circuit has also been reduced. The sampling decimator is saved and routing becomes even simpler, too. These features make the proposed scheme a good candidate for cost-efficient IFFT implementation in the DMT-based ADSL system.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for efficiently processing an Inverse Fast Fourier Transformation for a 2N point original input data sequence X(k), wherein said original input data sequence includes a real part $X_r(k)$ and an imaginary part $X_i(k)$ (k=0, . . . , N−1), comprising the steps of:

identifying a first modification pattern;

modifying said real part of original input data sequence based on said first modification pattern to form a modified real part $X_r'(k)$;

identifying a second modification pattern;

modifying said imaginary part of original input data sequence based on said second modification pattern to form a modified imaginary part $X_i'(k)$;

combing said modified real part $X_r'(k)$ and modified imaginary part $X_i'(k)$ together to form a modified input data $X'(k)$; and inputting said modified input data $X'(k)$ to an Inverse Fast Fourier transformation (IFFT) module to generate an output sequence.

2. The method in claim 1, wherein said first and second modification pattern is formed according to symmetrical and anti-symmetrical theory.

3. The method in claim 1, wherein modifying said real part from $X_r(k)$ to $X_r'(k)$ is to make an equation as follows equal to zero.

$$\sum_{k=0}^{N-1} X_r'(k) \cdot \sin\frac{n\pi k}{N} = 0 \text{ and } n = 0,1, \ldots, N-1.$$

4. The method in claim 1, wherein modifying said imaginary part from $X_i(k)$ to $X_i'(k)$ is to make an equation as follows equal to zero.

$$\sum_{k=0}^{N-1} X_i'(k) \cdot \cos\frac{n\pi k}{N} = 0 \text{ and } n = 0,1, \ldots, N-1.$$

5. The method in claim 1, wherein said modified real part $X_r'(k)$ is equal an equation as follows:

$X_r(k)+(-1)^n \cdot X_r(N-k)$ and n=0, 1, . . . , N−1.

6. The method in claim 1, wherein said modified imaginary part $X_i'(k)$ is equal to an equation as follows:

$X_i(k)+(-1)^{n+1} \cdot X_i(N-k)$ and n=0, 1, . . . , N−1.

7. The method in claim 1, wherein said original input data sequence $X(k)$ is a random sequence.

8. An apparatus for efficiently processing an Inverse Fast Fourier Transformation for a 2N point original input data sequence $X(k)$, wherein said original input data sequence includes a real part $X_r(k)$ and an imaginary part $X_i(k)$ (k=0, . . . , N−1), comprising:

a modifying device for modifying said real part and imaginary part of original input data sequence according to a first and second identified modification pattern to form a modified input data $X'(k)$; and an Inverse Fast Fourier transformation (IFFT) module for processing the Inverse Fast Fourier transformation (IFFT) for said modified input data $X'(k)$, wherein said Inverse Fast Fourier transformation (IFFT) module further comprises:

a plurality of lattice modules, said each lattice module receiving said modified input data $X'(k)$ to generate the first and the second output signal;

a plurality of calculating units, wherein any two calculating units are coupled to one lattice module for receiving the first and the second output signal of said lattice module, and one of said two calculating units for generating the difference of said first and second output signal and the other for generating the sum of said first and second output signal; and a plurality of shifter, wherein each shifter is coupled to one of said calculating units for receiving the output signal to shift right by $\log_2(2N)$ bits of said received output signal.

9. The apparatus in claim 8, wherein said first and second modification pattern is formed according to symmetrical and anti-symmetrical theory.

10. The apparatus in claim 8, wherein modifying said real part is to make an equation as follows equal to zero.

$$\sum_{k=0}^{N-1} X_r'(k) \cdot \sin\frac{n\pi k}{N} = 0 \text{ and } n = 0,1, \ldots, N-1.$$

11. The apparatus in claim 8, wherein modifying said imaginary part is to make an equation as follows equal to zero $$\sum_{k=0}^{N-1} X_i'(k) \cdot \cos\frac{n\pi k}{N} = 0 \text{ and } n = 0,1, \ldots, N-1.$$

12. The apparatus in claim 8, wherein said modified real part $X_r'(k)$ is equal to an equation as follows:

$X_r(k)+(-1)^n \cdot X_r(N-k)$ and n=0, 1, . . . , N−1.

13. The apparatus in claim 8, wherein said modified imaginary part $X_i'(k)$ is equal to an equation as follows:

$X_i(k)+(-1)^{n+1} \cdot X_i(N-k)$ and n=0, 1, . . . , N−1.

14. The apparatus in claim 8, wherein said original input data sequence $X(k)$ is a random sequence.

15. A method for efficiently processing an Inverse Fast Fourier transforming for an 2N point original input data sequence $X(k)$, wherein said original input data sequence includes a real part $X_r(k)$ and an imaginary part $X_i(k)$ (k=0, . . . , N−1), comprising the steps of:

modifying said real part of original input data sequence to $X_r(k)+(-1)^n \cdot X_r(N-k)$ and n=0, 1, . . . , N−1;

modifying said imaginary part of original input data sequence to $X_i(k)+(-1)^{n+1} \cdot X_i(N-k)$ and n=0, 1, . . . , N−1;

combing said modified real part and modified imaginary part together to form modified input data; and inputting said modified input data to an Inverse Fast Fourier transformation (IFFT) module to generate an output sequence.

16. The method in claim 15, wherein said original input data sequence $X(k)$ is a random sequence.

17. The method in claim 15, wherein said inputting said modified input data to generate an output sequence further comprises:

using a plurality of lattice modules to receive said modified input data wherein each of said lattice modules generates the first and the second output signal;

generating the difference signal of said first and second output signal;

generating the sum signal of said first and second output signal;

shifting right by $\log_2(2N)$ bits of said difference signal; and shifting right by $\log_2(2N)$ bits of said sum signal.

18. The method in claim 17, wherein said shifting right by $\log_2(2N)$ bits may use the right shifter.

* * * * *

UNITED STATES PATENT AND TRADEMARK OFFICE
CERTIFICATE OF CORRECTION

PATENT NO. : 6,985,919 B2
DATED : January 10, 2006
INVENTOR(S) : Yu et al.

It is certified that error appears in the above-identified patent and that said Letters Patent is hereby corrected as shown below:

<u>Title page,</u>
Item [73], Assignee, should read -- Industrial Technology Research Institute. --.

Signed and Sealed this

Sixth Day of June, 2006

JON W. DUDAS
*Director of the United States Patent and Trademark Office*